United States Patent [19]

Kajihara et al.

[11] Patent Number: 4,786,520
[45] Date of Patent: Nov. 22, 1988

[54] PROCESS FOR MANUFACTURING COCOA

[75] Inventors: Isamu Kajihara; Takeshi Morishima, both of Yokosuka; Shigeo Mori, Narashino, all of Japan

[73] Assignee: Morinaga & Co., Ltd., Tokyo, Japan

[21] Appl. No.: 862,725

[22] Filed: May 13, 1986

[51] Int. Cl.⁴ .............................................. A23G 1/00
[52] U.S. Cl. ..................................... 426/631; 426/444
[58] Field of Search ................ 426/631, 524, 444, 607

[56] References Cited

U.S. PATENT DOCUMENTS 4,308,288  12/1981  Hara et al. ........................... 426/631

FOREIGN PATENT DOCUMENTS 0201943  11/1983  Japan .................................... 426/631
1096948   5/1986  Japan .................................... 426/631

OTHER PUBLICATIONS

Minifie, B. W., Chocolate, Cocoa, and Confectionery, Avi Publ. Co. Inc., Westport Conn., 1980 pp. 55–58.
Massachusetts Chocolate Company; p. 2, Lines 19–102; FIGS. 1, 1a Carle & Montanari; p. 10, Paragraph 2, FIGS.
Hermann; pp. 1–3; FIGS.
Luco–Technic; claims 17, 18, 12, 13; p. 8, Paragraph 2, p. 17, Para. 3, FIGS. 2,1.
Confectionery Production, vol. 33, No. 10, Oct. 1967, pp. 691–694, F. Perry "Towards Efficient Cocoa Pulverisation".

Primary Examiner—Jeanette Hunter
Attorney, Agent, or Firm—Armstrong, Nikaido, Marmelstein & Kubovcik

[57] ABSTRACT

A process for manufacturing cocoa which comprises kibbling the cocoa cake obtained by pressing cacao mass, pulverizing the kibbled cake into cocoa powder, which is fluidized by sending cooling air to it, and by maintaining the fluidized state thereof for a definite period of time, said cocoa powder is cooled to 18°–30° C., whereby the liquid fat contained therein is crystallized in the stable form as minute crystals.

9 Claims, 1 Drawing Sheet

PROCESS FOR MANUFACTURING COCOA

FIELD OF THE INVENTION

This invention relates to an improved process for manufacturing cocoa, and more particularly to a process for manufacturing cocoa which has a good color tone because of the crystals of the fat contained therein being minute and stable.

BACKGROUND OF THE INVENTION

The conventional representative process for manufacturing cocoa comprises kibbling the cocoa cake obtained by pressing cacao mass, pulverizing the kibbled product which has once been stored for allowing to cool at the cost of time, cooling the pulverized cocoa powder and then obtaining the finished product by aging.

But the cocoa obtained in accordance with such a conventional process has in most cases a whitish color tone which cannot be generally accepted. This may probably be attributable to the fact that the fat contained in the cocoa particles obtained as the finished product is in the form of coarse crystals.

The expression "cocoa has a good color tone" as used herein means that cocoa has not only deep chocolate color but also gloss.

In order for cocoa to have a good color tone, it is essential that the crystals of the fat contained in the cocoa particles are minute.

It is considered that when the crystals of the fat contained are minute the cocoa particles acquire gloss and as the result assume their original deep chocolate color. On the contrary, however, it is considered that when the crystals of the fat contained are coarse, owing to the diffused reflection of light occurring on the surfaces of the crystals of the fat the cocoa becomes more whitish than original and also more deprived of gloss.

The color tone of cocoa changes as above depending on the state of the crystals of the fat contained therein, but if the color tone of the cocoa product after the manufacture should change during the storage or the like, it is never permissible from the standpoint of the degradation in the commercial value, so that in the manufacture of cocoa it becomes indispensable to obtain the finished product in the state of the crystals of the fat contained being stable.

That is to say, in order to manufacture cocoa which has a good color tone, there should simultaneously be satisfied two conditions that the crystals of the fat contained in the cocoa particles are minute and stable.

The crystals of the fat contained in cocoa are generally apt to be formed in an unstable state. Whether stable crystals are formed or unstable crystals are formed depends on the environmental temperature process. In other words, in order to obtain stable crystals, it is necessary to perform the crystallization at a definite temperature suited for it.

In general it is known that when the crystallization time is prolonged the crystal particles become corase, while when the crystallization time is short, fine crystals are formed. Accordingly, in order to make crystals minute, the fat in the molten state should be rapidly cooled at a temperature as low as possible, but the rapid cooling at a low temperature results in the formation of unstable crystals Also, when cocoa is cooled at the temperature suited for the formation of stable form of crystals in order to cause stabilization of these unstable crystals, the crystallization takes much time and these crystals become coarse.

The term "stabilization" as generally used means a phenomenon that the crystals of the fat transform from their unstable form to stable form. The stabilization in the process according to the present invention, however, is effected to such a degree as is sufficient to maintain a desired product quality of cocoa.

Heretofore, the above described two conditions have been considered to be opposite to each other, so that desirable process which can satisfy these two conditions simultaneously could not be found out.

In the conventional processes, it is difficult to convert all of the molten fat contained in the cocoa into crystals of stable form by means of cooling which is inevitably insufficient. The aging is carried out after the cooling so that the cocoa is stored for a long period of time at a desirable temperature required for formulation of stable crystals in order to avoid the crystals becoming unstable. Such a long time of aging is indispensable to stabilize the crystals. During this aging the crystals are apt to become coarse.

It is considered that as above described, in the conventional processes as the crystallization as well as the stabilization took much time, causing the crystals of the fat contained to become coarse, the cocoa product obtained was nothing but those which were unsatisfactory in the point of the color tone.

Also, in the conventional processes, for their practice there were required many apparatuses and installations, as well as extensive spaces for these apparatuses and installations, and therefore they had many disadvantages from the viewpoints of economy and efficiency.

For instance, in one of the conventional processes, wherein use is made of a double pipe pneumatic cooler, the treating time is extremely shorter than the time required for the crystals of the fat contained to transform into the stable form, so that the crystals of the fat contained in the cocoa powder do not transform into the stable form during this treatment.

Thus, as the aging for the stabilization of the crystals of the fat contained, it is required either that the cooled cocoa powder is once removed into a vessel and allowed to stand for 24 hours in a room at 18°-20° C., or that the powder is once more cooled by means of a cooling apparatus capable of cooling powder.

As above, in general, in the apparatus for manufacturing cocoa not only does the apparatus per se require a large space, but also there are required installations including a constant temperature room for aging, etc.

In addition to the above, there are also required various steps for cocoa powder such as temporary removal into a vessel, transportation for it, storage under cooling, transportation and feeding to the subsequent steps, etc. Furthermore, the conventional apparatuses, which had to be cleaned at frequent intervals, could not be free from a serious defect in the inefficiency arising from the need of downtime for the cleaning.

In view of these problems, the present inventors made extensive investigations, and as the result could find out a process for manufacturing cocoa having a good color tone, wherein even when the formation of crystals of the fat contained in cocoa particles and the stabilization of the thus formed crystals are carried out in one and the same apparatus and in a comparatively short period of time, it is possible to crystallize said fat in the stable form as minute crystals, and yet the treating time as well as the treating apparatus can be saved greatly, and thus this invention could be accomplished.

BRIEF SUMMARY OF THE INVENTION

It is an object of this invention to provide a process for manufacturing cocoa which is characterized in that the cocoa cake obtained by pressing cacao mass is kibbled, and further pulverized into cocoa powder, which is fluidized by sending cooling air to it from below, and by maintaining the fluidized state of said cocoa powder for a definite period of time, the temperature of said powder is lowered to 18°–30° C., whereby the fat contained in said cocoa powder is crystallized in the stable form as minute crtystals.

The temperature of the cooling air is 5°–25° C., preferably 5°–15° C. When the temperature of the cooling air is high, crystallization hardly takes place or takes much time, and undesirably there is a fear of the crystals becoming coarse, while when the temperature is too low, there is a fear that unstable crystals are formed In the process of this invention, particularly when the cocoa cake obtained by pressing cacao mass is kibbled and immediately thereafter the kibbled product is rapidly cooled to 35°–65° C. and then pulveried into cocoa powder, which is used as above, there is obtainable cocoa which has a better color tone.

This may be accounted for by considering that when the kibbled cocoa cake is immediately pulverized and cooled, large amount of the fat can remain on the surfaces of the cocoa particles because the cocoa is pulverized before the fat contained in the cocoa is absorbed within the cocoa particles, and thus the color tone of the cocoa is improved all the better.

The time during which the fluidized state is maintained should be taken to be at least 3 minutes, preferably 5 minutes or more to ensure the sufficient stabilization of the fat contained. Since it is economically a great loss to maintain the state for too long a time it should be ended within 60 minutes.

As the apparatus for the fluidized cooling use can be made of a fluidizer of vertical cylinder type, continuous fluidizer of horizontal type, fluidizer of directional property type, etc.

All the steps in the process of this invention can be carried out continuously in order by connecting the apparatuses used for them to each other by means of pneumatic conveyors.

In the above case, as the breaker of cocoa cake, use can be made of a breaker in conventional use for the manufacture of cocoa, and as the cooling apparatus for the kibbled cocoa cake, use can be made of a cooler such as paddle cooler, pneumatic cooler, continuous drum cooler, continuous band cooler, etc.

BRIEF DESCRIPTION OF THE INVENTION

FIG. 1 indicates a front cross-sectional view of one example of the fluidized cooler for carrying out the process of this invention.

FIG. 2 indicates a flow diagram of the process for manufacture in this invention.

DETAILED DESCRIPTION OF THE PREFERRED EMBODIMENTS OF THE INVENTION

With reference to the accompanying drawing this invention will be more fully explained.

Figure 1:
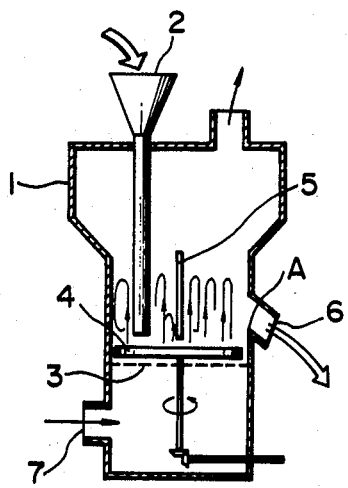

FIG. 1 diagrammatically shows one example of the fluidized cooler of vertical cylinder type for carrying out the fluidized cooling in accordance with this invention.

It is supposed that immediately after pulverization the greater part of the fat contained in the cocoa powder obtained by pulverizing cocoa cake is in a molten state. Such a cocoa powder is charged into a fluidized cooler 1 through charge port 2 to be fed on perforated plate 3, were said cocoa powder is fluidized by cooling air of 5°–25° C. which was sent from lower inlet 7 for cooling air and cooled while the fluidized condition is being maintained.

The fat in the molten state begins to crystallize by coming in contact with the cooling air, and the particles of cocoa powder in the fluidized state collide with each other, thereby the shock promoting the crystallization and the transformation of the crystals formed into stable crystals.

That is to say, the fat in the molten state in the cocoa powder crystallizes and the unstable crystals transform into the stable crystals. As the result, even without aging there is obtained cocoa in which the fat has crystallized in the form of stable crystals, in a short period of time.

Between perforated plate 3 and the basal part A of discharge port 6, there is formed the fluidized bed, and the cocoa fed is discharged from this discharge port 6 when it overflows the fluidized bed.

The time required for the actual transformation of crystals is the minimum 3 minutes. Accordingly, the time maintaining the fluidized condition should be taken to be at least 3 minutes.

In the case of a cooler of vertical cylinder type, in addition to stirrer 4, plate for partition 5 also should be provided in the center so that the cocoa powder may not go from charge port directly to discharge port.

When in practice using a fluidized cooler, the bed temperature was maintained at 15°–27° C., and the fluidizing time was 5–40 minutes, in spite of the fact that the treating time was extremely short as compared with the conventional processes it was confirmed by the measurement of the fat contained in the cocoa immediately after it was discharged from the cooler by means of a differential scanning calorimeter that the crystals of the fat contained were in the form of stable one.

Also when the above described cocoa was compared by organoleptics with those obtained by the conventional processes, it was recognized that in the product of this invention the color tone was extremely improved, differing much from the conventional ones in that it has most desirably a deep chocolate color and is surpassingly bright.

Figure 2:
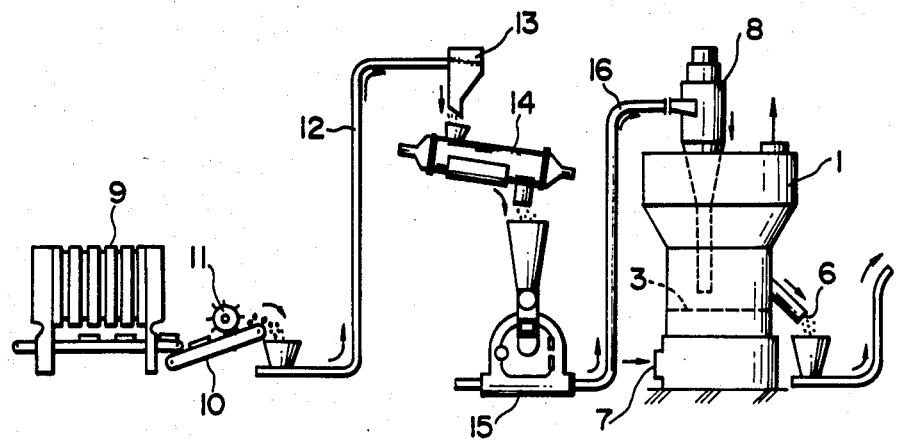

Next, explanation will be given to one illustrative example of the process for manufacturing cocoa utilizing the process of this invention, whose flow diaigram has been shown in FIG. 2.

The cocoa cake (cake temperature 90° C.) discharged from butter press 9 is transported on conveyor 10, kibbled in a breaker 11, transported by pneumatic conveyor 12, and then fed to a cooler 14 after being separated from air in a separator 13. The treating time of from the kibbling to this step is 1–2 minutes, so that the cake temperature hardly decreases. Though the time depends on the kind of the apparatus as well as the treating conditions, the cake temperature is cooled to about 45° C. by this cooler taking 5 minutes.

Heretofore, the effects of the fat contained in cocoa and its absorption in the interior of cocoa particles upon the color tone of the cocoa has been quite unknown, but the present inventors have discovered that it is of critical importance to the color tone of cocoa to crystallize the fat contained in cocoa on the surfaces of the cocoa particles.

That is to say, when the pulverized cocoa is cooled in the fluidized condition in accordance with this invention, it is the best way of improving the color tone of cocoa that the fat is allowed to remain as much as possible on the surfaces of the cocoa particles, namely that the fluidized cooling of the cocoa cake is performed before the fat is absorbed in the interior of the cocoa particles. Accordingly, it is most effective in order to improve the color tone of cocoa much more that before the fat contained is absorbed within the cocoa particles the cocoa cake is cooled in a short period of time to such an extent that pulverization is possible and then, after pulverization, subjected to fluidized cooling.

The kibbled product which was cooled is immediately pulverized in a pulverizer 15, in which case portion of the pulverization energy raises the cake temperature, so that the temperature rises to about 60° C. The fat contained in the cocoa powder at this temperature is in a molten state.

The pulverized cocoa particles are transported to a separator (cyclone) 8 by a pneumatic conveyor 16, where the cocoa separated from air is fed onto the perforated plate 3 of fluidized cooler 1.

The temperature of cocoa powder at this point is almost the same as immediately after the pulverization.

The cocoa powder fed to the fluidized cooler is cooled while forming a fluidized bed by the cooling air sent from below, and in this fluidized cooler the fat contained is crystallized into minute and stable crystals on the surfaces of the cocoa particles. The cocoa manufactured in this way has a very good color tone.

EXAMPLES 1-11 AND COMPARATIVE EXAMPLES 1-4

TABLE 1

| Example No. | Temp. of cocoa powder charged (°C.) | Temp. of cooling air (°C.) | Temp. within fluidized bed (°C.) | Fluidizing time (min.) | Temp. of cocoa discharged (°C.) | Evaluation | Note |
|---|---|---|---|---|---|---|---|
| 1 | 45 | 14 | 17 | 21 | 23 | ○ | |
| 2 | 48 | 15 | 22 | 21 | 26 | ○ | |
| 3 | 55 | 12 | 22 | 36 | 27 | ◉ | |
| 4 | 50 | 10 | 26 | 10 | 27 | ◉ | |
| 5 | 40 | 5 | 25 | 10 | 26 | ◉ | |
| 6 | 62 | 6 | 15 | 32 | 18 | ○ | |
| 7 | 47 | 8 | 21 | 6 | 25 | ◉ | |
| 8 | 38 | 8 | 22 | 6 | 23 | ○ | |
| 9 | 50 | 10 | 22 | 8 | 25 | ◉ | |
| 10 | 65 | 10 | 26 | 31 | 28 | ○ | Adhesion seen |
| 11 | 35 | 14 | 21 | 10 | 26 | ○ | |
| Comparative Example | | | | | | | |
| 1 | 33 | 13 | 25 | 25 | 25 | □ | |
| 2 | 55 | 3 | 10 | 30 | 15 | △ | |
| 3 | 40 | 5 | 28 | 2.5 | 32 | △ | |
| 4 | 70 | 10 | — | — | — | (Note 1) | |

Criterion for judging:
1. Stabilization of crystal: Judged by measuring melting point and latent heat by the use of a differential scanning calorimeter (D.S.C.).
2. Color tone and gloss: Judged by how near the chocolate color the cocoa is in organoleptic comparison with cocoas manufactured by the conventional processes Evaluation:
◉ = Crystals have sufficiently transformed into stable ones, color tone is also superior to the conventional products. Color is deep chocolate and gloss is good.
○ = Crystals have been stabilized, and color tone is also superior to the conventional products.
□ = Crystals have been stabilized but color tone is at the same level as the conventional products.
△ = Many crystals are unstable by the D.S.C. measurement. Color tone is also unstable.
Note 1 = Due to heavy adhesion in the pulverizer, test could not be made.

From the above results, it may be understood that in accordance with the process of this invention it is possible to manufacture a cocoa product which is deeper in color and far much better in color tone as compared with the conventional cocoa products, and moreover, the stabilization of the crystals of the fat contained in the cocoa particles can be achieved efficiently and in a short period of time by means of a comparatively small and single apparatus.

The effects achieved by this invention may be briefly enumerated as follows.

1. There is obtained cocoa which is extremely excellent in color tone.
2. The space for the equipment can be saved by a large margin.
3. Since the aging after cooling cocoa powder pulverized is unnecessary, and the handling operation is also not needed, the simplification of the working process and the reduction of the working hours can be contemplated.
4. The frequency in the cleaning of the apparatus for the steps after the pulverization was also as high as several times a day in an extreme case in the conventional processes, whereas in the process of this invention, it may be less than once per week, and moreover, as the cleaning method is also very simple, a far much higher working efficiency is obtainable.
5. It became possible, though heretofore very difficult, to deal with the operation ranging from the butter press to the stabilization of the crystals of the fat contained in a consistent continuous apparatus. In the case of such a consistent continuous step, as the aging for the stabilization of the fat crystals is not necessary, the storing step is also needless, and the handling operation is also unnecessary.
6. Since to process is operable in an airtightly sealed condition, sound proofing, dust proofing, and sanitation can be readily made, and there is no danger of being polluted from the outside.
7. Unattended operation is possible, and hence labor-saving is also possible.

What is claimed is:

1. In a process for manufacturing cocoa, wherein cocoa mass is produced from cocoa beans, said cocoa mass is pressed to prepare a cocoa cake and then said cocoa cake is pulverized into cocoa powder.

the improvements which comprise: feeding a cooling air upward to the cocoa powder, while the fat contained in said cocoa powder is still in a molten state, and the fat is present on the surfaces of cocoa particles, to thereby suspend said cocoa powder in said cooling air at a definite level, thereby forming a fluidized bed in which the suspended cocoa particles sufficiently contact with said cooling air and simultaeously collide with each other, thus resulting in the crystallization of the fat contained therein; further suspending the particles for a sufficient period for the transformation of the crystals thus formed into stable form, said period being from 3 to 60 minutes, whereby the cocoa particles are cooled to 18° to 30° C.; and thus producing a glossy cocoa of a good color tone containing minute and stable fat crystals.

2. The process as defined in claim 1, wherein immediately after said cocoa cake obtained by pressing said cocoa mass has been kibbled the kibbled product is rapidly cooled to 35°–65° C. and then pulverized into cocoa powder.

3. The process as defined in claim 1, wherein the temperature of said cooling air is 5°–25° C.

4. The process as defined in claim 2, wherein the temperature of said cooling air is 5°–25° C.

5. The process as defined in claim 3, wherein the temperature of said cooling air is 5°–15° C.

6. The process as defined in claim 4, wherein the temperature of said cooling air is 5°–15° C.

7. The process as defined in claim 1, wherein the time maintaining the fluidized state is 5–40 minutes.

8. The process as defined in claim 2, wherein the kibbled product is rapidly cooled to 45°–55° C.

9. The process as defined in claim 4, wherein the kibbled product is rapidly cooled to 45°–55° C.

* * * * *